(12) United States Patent
Sargor et al.

(10) Patent No.: US 8,514,845 B2
(45) Date of Patent: Aug. 20, 2013

(54) USAGE OF PHYSICAL LAYER INFORMATION IN COMBINATION WITH SIGNALING AND MEDIA PARAMETERS

(75) Inventors: Chandramouli Sargor, Sunnyvale, CA (US); Santosh Panattu Sethumadhavan, Santa Clara, CA (US); Prasanna Sathyanarayana, Sunnyvale, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1183 days.

(21) Appl. No.: 12/409,415

(22) Filed: Mar. 23, 2009

(65) Prior Publication Data

US 2010/0165980 A1    Jul. 1, 2010

Related U.S. Application Data (60) Provisional application No. 61/142,171, filed on Dec. 31, 2008.

(51) Int. Cl.
*H04L 12/66* (2006.01)

(52) U.S. Cl.
USPC .......................................... 370/352; 370/400

(58) Field of Classification Search
USPC ........... 370/352–356, 389, 392, 395.2–395.3, 370/400–401, 410, 441–442, 479–480
See application file for complete search history.

(56) References Cited

U.S. PATENT DOCUMENTS

| | | | | |
|---|---|---|---|---|
| 5,650,994 | A * | 7/1997 | Daley .............................. | 370/259 |
| 6,236,657 | B1 * | 5/2001 | Andersson et al. ........... | 370/400 |
| 7,031,314 | B2 * | 4/2006 | Craig et al. ................... | 370/392 |
| 7,170,871 | B2 * | 1/2007 | Eyuboglu et al. ............. | 370/331 |
| 7,697,547 | B2 * | 4/2010 | Diouf et al. ................... | 370/399 |
| 7,765,294 | B2 * | 7/2010 | Edwards et al. .............. | 709/224 |
| 2003/0053448 | A1 * | 3/2003 | Craig et al. ................... | 370/353 |
| 2003/0072305 | A1 * | 4/2003 | Odenwalder et al. ......... | 370/389 |
| 2006/0227747 | A1 * | 10/2006 | Kim et al. ..................... | 370/331 |
| 2007/0064692 | A1 * | 3/2007 | Pi et al. ......................... | 370/389 |

OTHER PUBLICATIONS

Taylor, Tom et al., MultiService Forum Architecture Framework, MSF Release 3 Architecture, MSF-ARCH-003.00-FINAL, Jun. 2, 2006, 49 pages.
J. Rosenberg et al., SIP: Session Initiation Protocol, Network Working Group, Request for Comments: 3261, Jun. 2002, 269 pages.

\* cited by examiner

*Primary Examiner* — Kevin Mew
(74) *Attorney, Agent, or Firm* — Blakely Sokoloff Taylor & Zafman, LLP (57) ABSTRACT

A plurality of subscriber connections for a plurality of subscribers is established, where the establishment of each subscriber connection includes receiving a connection request message from a subscriber that includes physical layer information identifying a physical access connection on which the connection request message was received. A physical layer identifier is assigned for the subscriber connection that uniquely identifies the subscriber connection and is based on the physical layer information. A first signaling message is received on a first one of the established subscriber connections and includes a subscriber identifier of a subscriber. The subscriber identifier is associated with the physical layer identifier of the first subscriber connection. Subsequently, messages are received that include the subscriber identifier of the subscriber. The ones of those messages that were received on the first subscriber connection are processed.

22 Claims, 7 Drawing Sheets

USAGE OF PHYSICAL LAYER INFORMATION IN COMBINATION WITH SIGNALING AND MEDIA PARAMETERS

CROSS-REFERENCE TO RELATED APPLICATIONS

This application claims the benefit of U.S. Provisional Application No. 61/142,171, filed Dec. 31, 2008, which is hereby incorporated by reference.

BACKGROUND

1. Field

Embodiments of the invention relate to the field of networking; and more specifically, to the usage of physical layer information in combination with signaling and media parameters.

2. Background

A Session Border Controller (SBC) is a session aware device that typically sits at the border of a network and manages services (e.g., Voice over IP (VoIP)). A session can either be a voice, video, or other multimedia session. Typically, SBCs are inserted in the path of signaling traffic and/or media traffic. This allows the SBCs to inspect the signaling and/or media traffic and take action on that traffic.

Typically, SBCs have been implemented as a standalone device. A typical architecture includes placing an SBC in front of a softswitch to protect the softswitch from malicious traffic and perform other processing prior to the traffic reaching the softswitch.

VoIP is typically deployed in a network that has one or more SBCs. VoIP services are typically based on an open IP based network architecture. While this facilitates greater connectivity and makes it easier to introduce new services, it also renders the VoIP network vulnerable to issues that are typically associated with data networks (e.g., denial of service (DoS) attacks in the form of excessive signaling and/or malformed messages). Typical methods identify and authenticate subscribers based on the address of record (AOR) transmitted. An AOR is typically a SIP (Session Initiation Protocol) or SIPS URI (Uniform Resource Identifier) that points to a domain with a location service that can map the URI to another URI where the user might be available. Typically, the location service is populated through registrations. An AOR is frequently thought of as the "public address" of the user. The AOR may be a phone number or other information intended to be unique to a subscriber (e.g., email address, username/password, etc.). However, an AOR may be spoofed (e.g., a malicious user may impersonate a subscriber by using the AOR of that subscriber).

E911 (emergency calls) regulations require that subscriber location information (e.g., the street address where the call has been placed) be transmitted along with every emergency call. Typically, subscribers must manage their address information and update the information if they move.

SPIT (Spam over Internet Telephony) is the transmission of unsolicited SIP (Session Initiation Protocol) messages to one or more recipients in the network. SPIT reduces network capacity, is a burden in processing and the amount of network traffic, and is irritating to VoIP subscribers. SPIT messages may be detected by using white lists, black lists, circles of trust, or a combination of the above.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, computer end stations, etc.). Some network elements are "multiple services network elements" that provide support for multiple networking functions (e.g., routing, bridging, switching, Layer 2 aggregation, subscriber management, and/or session border controller functionality), and/or provide support for multiple application services (e.g., data, voice, and video). Subscriber computer end stations (e.g., workstations, laptops, palm tops, mobile phones, smartphones, multimedia phones, portable media players, GPS units, gaming systems, set-top boxes, VoIP phones, etc.) access content/services provided over the Internet and/or content/services provided on virtual private networks (VPNs) overlaid on the Internet. The content and/or services are typically provided by one or more server computer end stations belonging to a service or content provider, and may include public webpages (free content, store fronts, search services, etc.), private webpages (e.g., username/password accessed webpages providing email services, etc.), corporate networks over VPNs, etc. Typically, subscriber computer end stations are coupled (e.g., through customer premise equipment coupled to an access network (wired or wirelessly)) to edge network elements, which are coupled (e.g., through one or more core network elements to other edge network elements) to the server computer end stations.

Some network elements support the configuration of multiple contexts. As used herein, each context includes one or more instances of a virtual network element (e.g., a virtual router, virtual switch, or a virtual bridge). Each context typically shares system resources (e.g., memory, processing cycles, etc.) with other contexts configured on the network element, yet is independently administrable. For example, in the case of multiple virtual routers, each virtual routers may share system resources but is separate from the other virtual routers regarding its management domain, AAA (authentication, authorization, and accounting) name space, IP address, and routing database(es). Multiple contexts may be employed in an edge network element to provide direct network access and/or different classes of services for subscribers of service and/or content providers. As another example, in the case of multiple virtual switches, each virtual switch may share system resources but each virtual switch maintains its own forwarding table, which, for example, may be used to map Media Access Control (MAC) addresses to virtual circuits.

AAA (authentication, authorization, and accounting) may be provided for through an internal or external server, such as a RADIUS (Remote Authentication Dial-In User Service) or DIAMETER server. The AAA server provides subscriber records for subscribers that identify, among other subscriber configuration requirements, to which context (e.g., which of the virtual routers) the corresponding subscribers should be bound within the network element. As used herein, a binding forms an association between a physical entity (e.g., port, channel, etc.) or a logical entity (e.g., interface, virtual circuit, etc.) with a higher-layer protocol interface over which network protocols (e.g., routing protocols, bridging protocols) are configured for a given context. Subscriber data flows on the physical entity when some higher-layer protocol interface is configured and associated with that physical entity. By way of a summary example, subscriber computer end stations may be coupled (e.g., through an access network) through a multiple services edge network element (supporting multiple contexts (e.g., multiple virtual routers), interfaces, and AAA) coupled to core network elements coupled to server computer stations of service/content providers, Further, AAA processing is performed to identify the subscriber record for a subscriber, that subscriber record identifies one or more virtual routers in the network element to which that subscriber's traffic should be bound, and the physical entity carrying that subscriber's traffic (e.g., the circuit) is bound to an interface of that virtual router.

Figure 1:
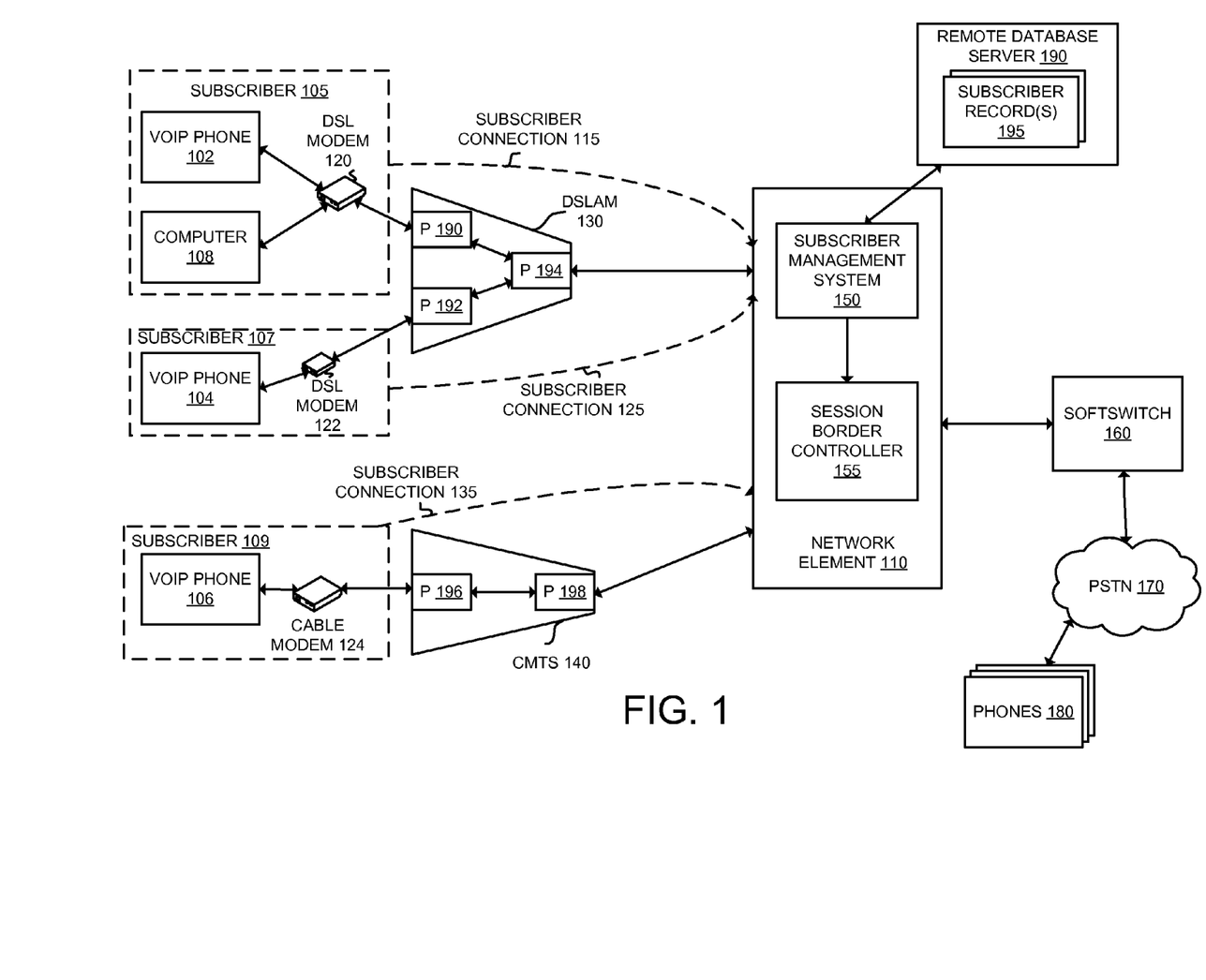
FIG. 1 illustrates an exemplary network element according to one embodiment of the invention.

FIG. 1 illustrates an exemplary network used in embodiments of the invention described herein. FIG. 1 includes the network element 110. The network element 110 terminates subscribers including fixed subscribers (e.g., DSL (digital subscriber line) subscribers, cable subscribers, etc.) and/or mobile subscribers (e.g., WiFi, WiMAX, etc.). As illustrated in FIG. 1, the network element 110 terminates the subscribers 105, 107, and 109. Subscribers are the end users of the services provided by the network element 110. The subscribers 105 and 107 are each DSL subscribers and the subscriber 109 is a cable subscriber. The subscriber 105 establishes the subscriber connection 115 with the network element 110, the subscriber 107 establishes the subscriber connection 125 with the network element 110, and the subscriber 109 establishes the subscriber connection 135 with the network element 110. The subscriber connections 115, 125, and 135 are logical constructs that define the parameters of network connectivity for the subscribers 105, 107, and 109 respectively.

The voice over IP (VoIP) phone 102 and the computer 108 are each coupled with the DSL modem 120, and each belong to the subscriber 105 (typically the VoIP phone 102, the computer 108, and the DSL modem 120 are each located at the subscriber's premises). Similarly, the VoIP phone 104, which is coupled with the DSL modem 122, belongs to the subscriber 107, and the VoIP phone 106, which is coupled with the cable modem 124, belongs to the subscriber 109. The VoIP phones 102, 104, 106, and the computer 108, are each subscriber computer end stations. The DSL modems 120 and 122 are coupled with the DSLAM (digital subscriber line access multiplexer) 130 via the ports 190 and 192 of the DSLAM 130 respectively. The cable modem 124 is coupled with the CMTS (cable modem termination system) 140 via the port 196. The DSLAM 130 is coupled with the network element 110 through its port 194, and the CMTS 140 is coupled with the network element 110 via its port 198. The ports 190, 192, and 196 are used only by the subscribers 105, 107, and 109 respectively.

The network element 110 includes the subscriber management system 150 and the session border controller 155. The subscriber management system 150 generally is related to the management of the subscribers terminated at the network element 110. For example, the subscriber management system 150 establishes the subscriber connections 115, 125, and 135, determines the attributes for those subscriber connections, and applies those attributes to those subscriber connections. The subscriber management system 150 is coupled with the remote database server 190. The remote database server 190 is an authentication, authorization, and accounting (AAA) server (e.g., RADIUS server, Diameter server, etc.). The remote database server 190 maintains subscriber records 195 each defining a set of attributes (e.g., subscriber name, password, authentication, access control, rate-limiting values, policing values, street address, bandwidth values, etc.) for the subscribers. The remote database server 190 provides the subscriber information to the subscriber management system 150.

The network element 110 processes traffic related to multimedia sessions (e.g., VoIP sessions, video conferencing sessions, video on demand sessions, etc.) as well as other media traffic (e.g., email traffic, standard Internet traffic, etc.). This traffic may be processed, perhaps at the same time, for a given subscriber (and over a given subscriber connection). For example, the network element 110 may process traffic over the subscriber connection 115 from the VoIP phone 102 and the computer 108, at substantially the same time. In other words, the network element 110 may process traffic for multiple sessions and/or media over a given subscriber connection at any given time.

The subscriber management system 150 is coupled with the session border controller module 155. The session border controller 155 is coupled with the softswitch 160. The softswitch 160 is coupled the phone(s) 180 through the PSTN (public switched telephone network) 170. The softswitch 160 connects calls from the VoIP phones 102, 104, and 106 to the phone(s) 180. The session border controller module 155 handles the signaling traffic and media traffic of certain sessions of the subscribers 105, 107, and 109. For example, the session border controller module 155 performs VoIP signaling (establishing a call) and processes VoIP media traffic (the data of the established call). As used herein, a call refers to communication between peers, which includes a VoIP call (similar to a regular telephone call) and other multimedia calls (e.g., video conferencing, interactive gaming, video on demand, etc.).

The subscriber management system 150 passes subscriber information to the session border controller 155 to be used by the session border controller 155 during signaling and/or processing media traffic. For example, the subscriber management system 150 passes physical layer information associated with subscribers to the session border controller 155.

Figure 3:
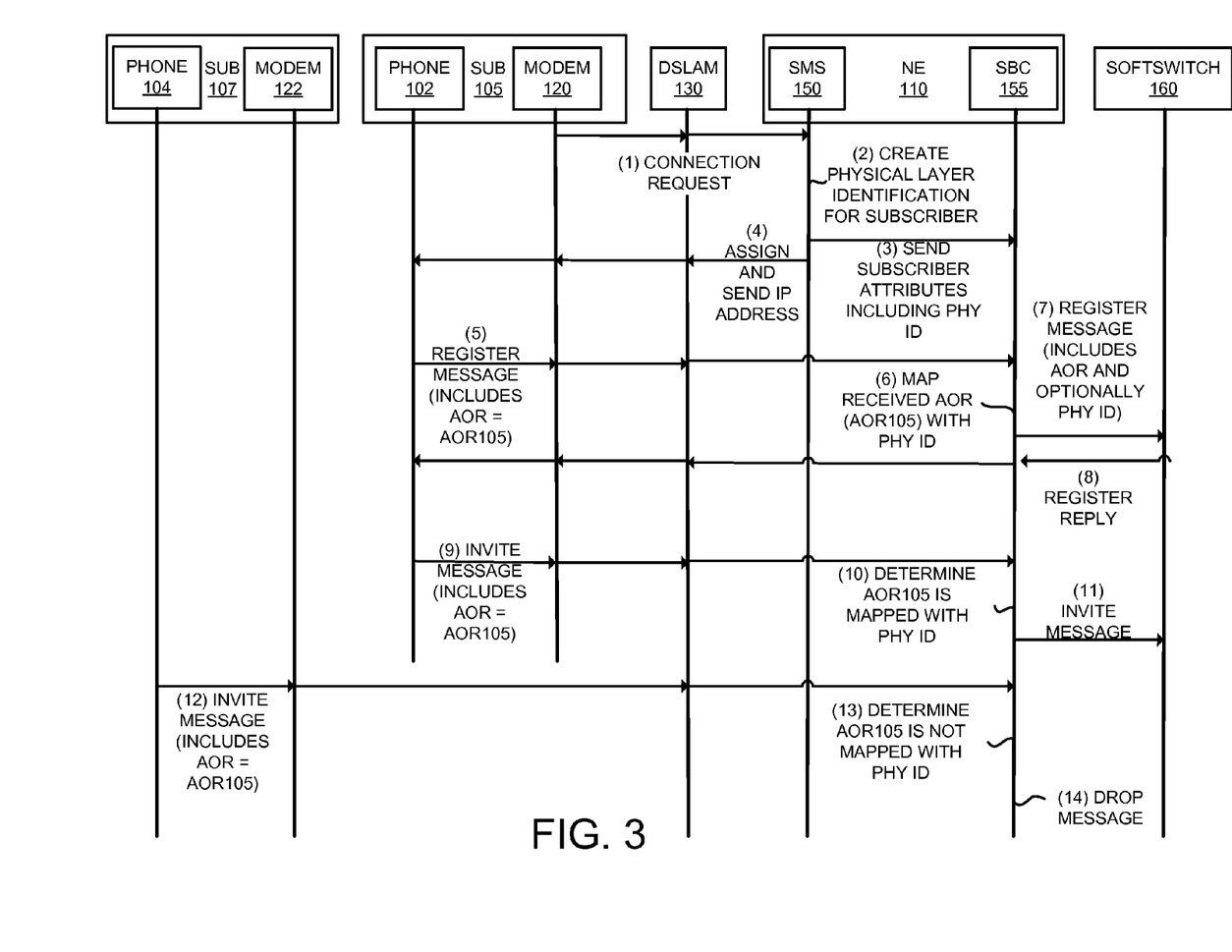
FIG. 3 is a data flow diagram illustrating processing of call requests according to one embodiment of the invention.

FIG. 3 is a data flow diagram illustrating processing of call requests according to one embodiment of the invention. FIG. 3 includes the subscriber 107 (the VoIP phone 104 and the DSL modem 122), the subscriber 105 (the VoIP phone 102 and the DSL modem 120), the DSLAM 130, the network element 110 (which includes the subscriber management system 150 and the session border controller 155) and the softswitch 160.

At operation 1, the DSL modem 120 transmits a connection request to the network element 110. The connection request may be transmitted responsive to the DSL modem 120 being powered up and connected. The connection request is received by the DSLAM 130 at port 190 and transmitted by the DSLAM 130 out the port 194 to the network element 110. The subscriber management system 150 of the network element 110 receives the connection request, and begins the process of establishing the connection (the subscriber connection 115). The connection request typically includes information identifying the subscriber (e.g., if a PPPoE connection is being established, a PPPoE username/password is typically included), and information identifying the physical access circuit on which the connection message was received. For example, typically the DSLAM 130 intercepts the connection request and inserts an agent remote ID and an agent circuit ID into the connection request message. The agent circuit ID is a local identifier used to determine the physical access circuit from which a message was received. The agent circuit ID may identify the port from which the connection message was received. For example, with reference to FIG. 1, the DSLAM 130 may enter an identification into the agent circuit ID which identifies the port 190 (the connection request was received at the port 190). The agent remote ID is used to identify the remote host end of the circuit, and is globally unique (e.g., an ID of the DSLAM 130).

Figure 2:
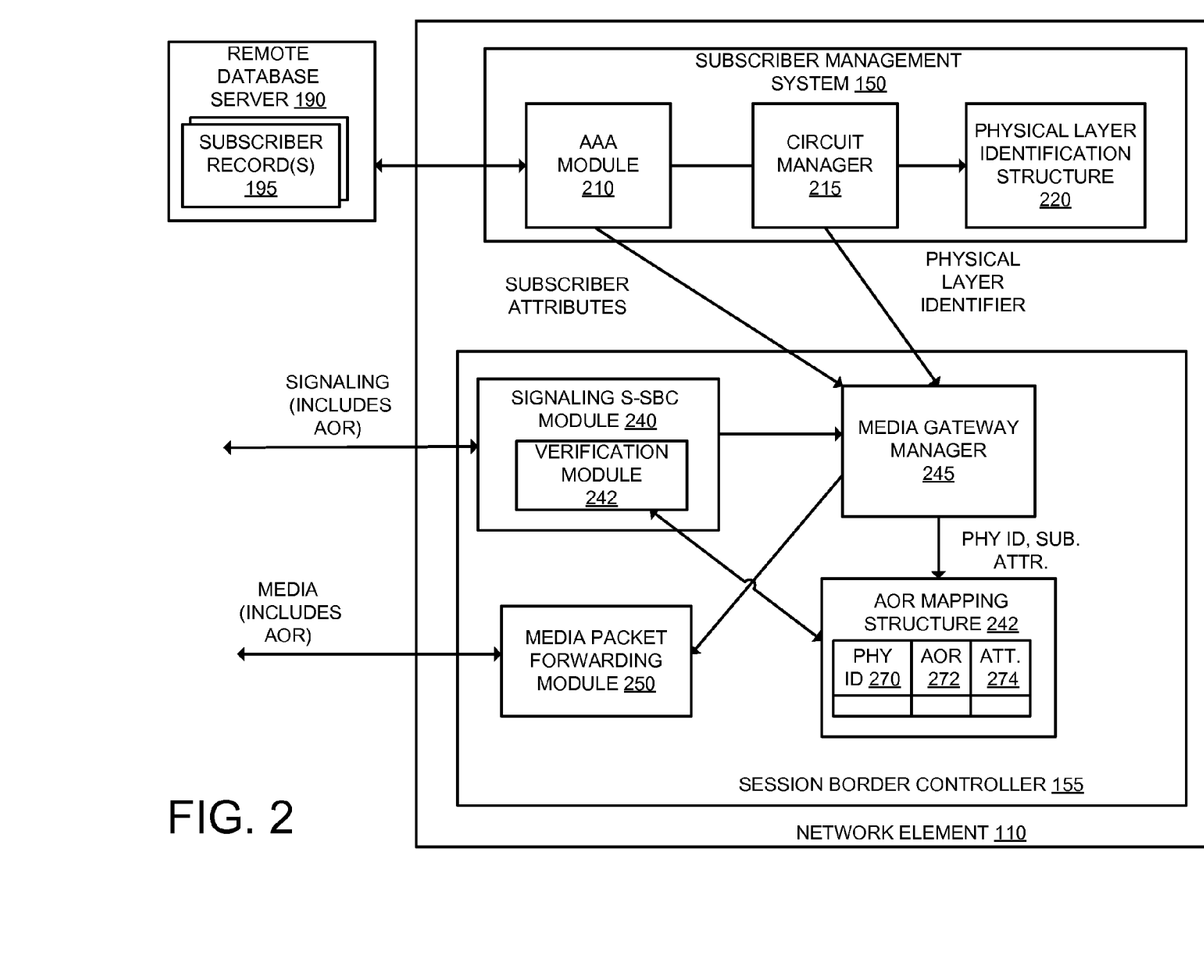
FIG. 2 is a detailed view of the network element illustrated in FIG. 1 according to one embodiment of the invention.

The subscriber management system 150 authenticates and authorizes the subscriber corresponding to the connection request message (e.g., the subscriber 105). FIG. 2 is a more detailed view of the network element 110 according to one embodiment of the invention. As illustrated in FIG. 2, the subscriber management system 150 includes the AAA (authentication, authorization, and accounting) module 210, the session manager 215, and the physical layer information structure 220. The AAA 210 authenticates and authorizes subscribers (e.g., the subscriber 105). For example, the AAA 210 transmits a subscriber authorization request message to the remote database server 190 to determine whether the subscriber 105 is authorized for service and the service attributes associated with the subscriber 105 (e.g., level of service, bandwidth values (upload and download values), policing values, etc.). The remote database server 190 responds with an indication whether the subscriber is authenticated and any attributes associated with the subscriber. The subscriber management system 150 maintains a subscriber record for each subscriber including the attributes associated with the subscriber.

After authenticating the subscriber, at operation 2, the subscriber management system 150 creates a physical layer identifier for the subscriber identified in the connection request message. In one embodiment of the invention, the physical layer identification is based on the agent remote ID and the agent circuit ID transmitted in the connection request. The physical layer identification corresponds with a physical layer component unique to the subscriber (e.g., a physical access circuit). For example, with reference to FIG. 1, the physical layer identification created for the subscriber 105 corresponds with the port 190 of the DSLAM 130, which is associated only with the subscriber 105.

According to one embodiment of the invention, the physical layer identification identifies a subscriber circuit. A subscriber circuit is a logical construct uniquely associated with a subscriber connection within a network element (e.g., the network element 110), and typically exists for the lifetime of the subscriber connection. Each packet sent over a subscriber connection will be associated with a subscriber circuit. With reference to FIG. 2, the circuit manager 215 creates the subscriber circuit and the physical layer identification associated with the subscriber circuit for the subscriber 105. The circuit manager 215 maintains the physical layer identification structure 220, which includes the physical layer identifiers used in the network element 110.

Each subscriber connection has one or more attributes, typically defined within a subscriber record (e.g., access control, rate-limiting values, policing values, bandwidth values, street address of the subscriber, etc.). The subscriber records may be stored internally within the network element 110 and/or within the remote database server 190. At operation 3, the SMS module 150 sends the physical layer identifier identifying the subscriber connection 115 and one or more subscriber attributes of the subscriber connection 115 to the session border controller 155. As illustrated in FIG. 2, the session border controller 155 includes the signaling session border controller module 240, the media gateway manager 245, the media packet forwarding module 250, and the AOR mapping structure 242. The media gateway manager 245 receives the physical layer identification of the subscriber 105 and the subscriber attributes associated with the subscriber 105. The media gateway manager 245 programs the media packet forwarding module 250. In addition, the media gateway manager 246 installs the physical layer identifier and any attributes into the AOR mapping structure 242. As illustrated, the AOR mapping structure 242 includes the physical layer identifier field 270, the AOR field 272, and the subscriber attribute(s) field 274 (which may be implemented as a linked list, a bitmap, etc.). Although the AOR mapping structure 242 is illustrated as a single structure, it should be understood that the values may be stored in multiple structures (e.g., a separate structure may store the subscriber attributes based on the physical layer identifiers).

In one embodiment of the invention, the SMS module 150 sends a subset of the physical layer identifiers to the session border controller module 155. For example, the SMS module 150 may send the physical layer identifiers to the session border controller 155 for those subscribers that use the session border controller 155 (e.g., VoIP subscribers) and/or certain types of session types (e.g., video conferencing, interactive gaming, Video on Demand, etc.) and/or media types (e.g., audio, video, fax, file transfer, etc.). In another embodiment of the invention, the SMS module 150 sends each physical layer identifier to the session border controller module 155.

At operation 4, the SMS module 150 assigns an IP address for the subscriber connection 115, and an indication of the assigned IP address is forwarded to the phone 102 through the DSLAM 130 and the DSL modem 120. After the IP address has been assigned, the subscriber connection 115 has been established and the subscriber 105 may begin to use the subscriber connection 115 (e.g., the computer 108 may begin to send and receive packets from a network (e.g., the Internet, a corporate network, etc.)). Thus, in one embodiment of the invention, the establishment of the subscriber connection 115 is performed in the operations 1-4. However, in order to use the VoIP phone 102, a VoIP session must be established (e.g., through use of the Session Initiation Protocol (SIP), defined in Request For Comments (RFC) 3261, "SIP: Session Initiation Protocol", June 2002. SIP is an application layer control (signaling) protocol for creating, modifying, and terminating sessions with one or more participants, such as VoIP phone calls, multimedia distribution, and multimedia conferences. Of course, it should be understood that sessions may be established with different protocols in different embodiments of the invention.

Although not illustrated in FIG. 3, it should be understood that similar operations are performed when establishing the subscriber connection 125 for the subscriber 107. For example, the DSL modem 122 transmits a similar connection request message to the network element 110, which is intercepted by the DSLAM 130 which inserts an agent remote ID and agent circuit ID into the message prior to forwarding the message to the network element 110, and the network element 110 assigns a circuit to the subscriber 107 and assigns a physical layer identifier based on the agent remote ID and the agent circuit ID which uniquely identifies the subscriber connection 125 (e.g., the physical layer identifier corresponds with the port 192 of the DSLAM 130).

In addition, it should be understood that similar operations are performed when establishing the subscriber connection 135 for the subscriber 109. For example, the cable modem 124 transmits a similar connection request message to the network element 110, and the CMTS 140 inserts an indication of the physical access connection of the subscriber 109 (e.g., the physical access connection between the cable modem 124 and the port 196) prior to sending the message to the network element 110. The network element 110 will assign a circuit for the subscriber 109 and assigns a physical layer identifier based on the physical access connection indication sent by the cable modem which uniquely identifies the subscriber connection 135 (e.g., the physical layer identifier corresponds with the port 196 of the CMTS 140).

After the subscriber connections 115, 125, and 135 are established, packets belonging to the subscribers 105, 107, and 109 respectively may be sent and received at the network element 110. Of course, it should be understood that the VoIP phones 102, 104, and 106 typically require a further registration (e.g., with the softswitch 160) prior to being able to make or receive calls. This registration process will be described later herein. The packets sent by the subscribers 105, 107, and 109 may be identified as belonging to the subscriber connections 115, 125, and 135 based on the parameters of the packets as they are received (e.g., the port that the subscriber connection has been established on, IP address, source MAC address, etc.). Each packet sent over the subscriber connections 115, 125, and 135 will be associated with the physical layer identifier corresponding with those subscriber connections. For example, upon receiving a packet from the VoIP phone 102 (e.g., a call request), that packet will be associated with the physical layer identifier corresponding with the subscriber connection 115.

Registration operations are typically performed as part of establishing sessions such as VoIP sessions (and other types of sessions). Referring back to FIG. 3, at operation 5, the VoIP phone 102 transmits a register message to the softswitch 160 in order to register the VoIP phone 102 to allow the phone to make and receive calls. Registration allows the VoIP phone 102 to upload its current location for use by network elements throughout the network. The register message is forwarded through the DSL modem 120 and the DSLAM 130 and intercepted by the session border controller 155. The register message is transmitted over the subscriber connection 115 (thus, the register message is associated with the physical layer identifier corresponding with the subscriber connection 115 belonging to the subscriber 105). In one embodiment of the invention, the register message is a SIP REGISTER message.

The register message includes a subscriber identifier of the subscriber 105. For example, the subscriber identifier is an address of record (AOR) of the subscriber 105 (e.g., AOR105). AORs are intended to be unique among subscribers. For example, the AOR is typically a username/password, email address, phone number, SIP Uniform Resource Identifier (URI), etc. However, it should be understood that although the AORs are intended to be unique, AORs may be spoofed. For example, a malicious subscriber may use the AOR that belongs to another subscriber. With reference to FIG. 2, the signaling session border controller (S-SBC) module 240 receives the register message (the register message is a signaling message).

At operation 6, the session border controller 155 maps the AOR received in the register message with the physical layer identifier associated with the subscriber connection 115. With reference to FIG. 2, the S-SBC module 240 extracts the AOR in the register message and passes the AOR to the media gateway manager 245. In one embodiment of the invention, the S-SBC module 240 further maps the AOR with the physical layer identifier of the subscriber connection 115 by programming the AOR mapping structure 242 with the AOR in the AOR field 272. In another embodiment of the invention, the media gateway manager 245 maps the AOR with the physical layer identifier associated with the subscriber connection 115 by programming the AOR mapping structure 242 with the AOR in the AOR field 272. According to one embodiment of the invention, the AOR will be mapped to the subscriber connection as long as there is not an entry for the AOR field 272 currently associated with the physical layer identifier. According to one embodiment of the invention, the entry for a subscriber in the AOR mapping structure 242 will be removed upon instruction from an Internet Service Provider (ISP) that provides service to that subscriber (e.g., if the subscriber moves or removes their account, etc.).

At operation 7, the session border controller 155 transmits the register message, including the AOR and optionally the physical layer identifier, to the softswitch 160. The physical layer identifier may optionally be transmitted as SIP access network info (e.g., as defined in the IETF draft "draft-mills-sip-access-network-info-03" entitled "Private Session Initiation Protocol Extension for Access Network Information", June 2002) to the softswitch 160. The softswitch 160 may use the physical layer identifier when determining whether accept a registration and/or whether to place a call from the phone associated with the physical layer identifier.

At operation 8, the softswitch 160 transmits a register reply message indicating that the registration was successful. Once the registration reply message reaches the VoIP phone 102, the VoIP phone 102 is registered and is ready to make and receive calls.

Since the AOR of the subscriber 105 (e.g., AOR105) is mapped with the physical layer identifier uniquely identifying the subscriber connection 115, each subsequent SIP signaling message (e.g., invite messages, acknowledgement messages, register messages, etc.) including an AOR of the subscriber 105 (e.g., AOR105) is checked to determine whether the physical layer identifier associated with the subsequent SIP signaling message is mapped to the AOR105 (that is, whether subsequent SIP signaling messages with an AOR of the subscriber 105 are received over the subscriber connection 115). Thus, the session border controller 155 may drop SIP signaling messages that include the AOR of the subscriber 105 that are not received over the subscriber connection 115 (identified through the AOR mapping structure 242). Similarly, the session border controller 155 may drop SIP signaling messages received over the subscriber connection 115 that do not include the AOR of the subscriber 105.

At operation 9, the phone 102 transmits an invite message (e.g., a SIP INVITE message) to the softswitch 160 (which is intercepted by the session border controller 155). An invite message is a message that allows participants to agree on a set of compatible media types for the session (thus, the invite message allows the participants to determine the parameters of the session). In operation 9, the invite message is related to a VoIP session (e.g., call). Invite messages include the AOR of the sender and the identity of the recipient (e.g., SIP URI, dialed number, etc.). In FIG. 3, the invite message includes an AOR of the subscriber 105 (e.g., AOR105). As mentioned above, AORs may be spoofed (e.g., one subscriber may enter in another subscribers AOR (email address, phone number, etc.) in an attempt to use the services associated with that subscriber).

To guard against AOR spoofing, at operation 10, the session border controller module 155 verifies that the AOR in the invite message corresponds with the physical layer identifier associated with the invite message. As described above, each subscriber packet processed at the network element 110 is associated a physical layer identifier. If the AOR in the invite message does not correspond with the physical layer identifier on which the AOR message was received, the invite message will not be processed. However, if the AOR in the invite message corresponds with the physical layer identifier on which the AOR message was received, the invite message is processed and transmitted to the softswitch 160. With respect to FIG. 2, the invite message is received at the S-SBC module 240, and the verification module 242 determines whether the AOR included in the invite message (e.g., AOR105) matches the physical layer identifier associated with the invite message. As illustrated in FIG. 3, the AOR included in the invite message matches the physical layer identifier associated with the invite message. Thus, at operation 11, the session border controller 155 transmits the invite message to the softswitch 160.

At operation 12, the session border controller module 155 intercepts an invite message transmitted from the VoIP phone 104 (of the subscriber 107) to the softswitch 160. The invite message is received over the subscriber connection 125. Thus, the invite message is associated with the physical layer identifier that identifies the subscriber connection 125. The invite message includes an AOR purporting to be from the subscriber 105 (e.g., AOR105). Thus, the subscriber 107 is attempting to spoof the AOR of subscriber 105 (or some other error has occurred causing the wrong AOR to be transmitted such as a virus or worm). At operation 13, the session border controller 155 determines that the AOR received in the invite message (e.g., AOR105) is not associated with the physical layer identifier associated with the invite message. In other words, the session border controller 155 determines that the AOR included in the invite message is not associated with the subscriber connection 125 on which the invite message was received. Since the AOR included in the invite message is mapped to a physical layer identifier of the subscriber 105, the session border controller 155 will drop the message at operation 14. Of course, it should be understood that the session border controller 155 may take further actions (e.g., logging the error, notifying the subscriber 105 of the attempt, notifying the subscriber 107 of the attempt, adding an access control list to block traffic from subscriber 107, etc.).

Figure 4:
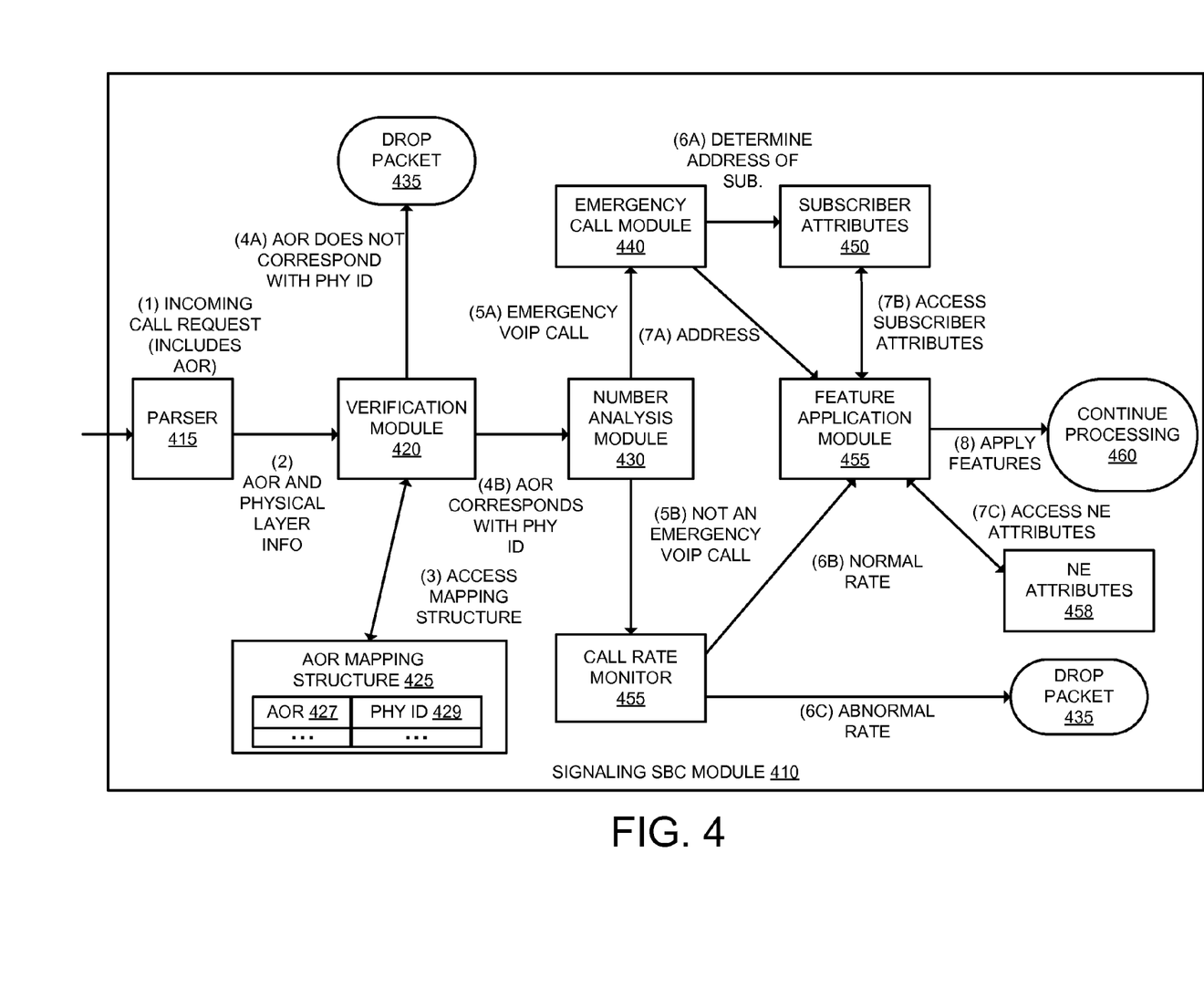
FIG. 4 is a data flow diagram illustrating an exemplary signaling session border controller module according to one embodiment of the invention.

FIG. 4 is a data flow diagram illustrating one embodiment of a S-SBC module. The S-SBC module 410 includes the parser 415, the verification module 420, the AOR mapping structure 425, the number analysis module 430, the call rate monitor 455, the emergency call module 440, the subscriber attributes 450, the network element attributes 458, and the feature application module 455. The operations described in FIG. 4 are performed on established subscriber connections and for equipment (e.g., VoIP phones) that has been registered (and thus have an AOR to physical identifier mapping) according to one embodiment of the invention. According to one embodiment of the invention, the S-SBC module 410 is implemented within the session border controller 155 illustrated in FIG. 1.

At operation 1, the parser 415 parses an incoming call request message (e.g., a SIP Invite message) and extracts the AOR information included in the message. At operation 2, the AOR is passed to the verification module 420 (from the parser 415), along with the physical layer identifier associated with the packet. According to one embodiment of the invention the physical layer identifier is an internal handle used to identify the subscriber connection uniquely within the network element 110.

At operation 3, the verification module 420 accesses the AOR mapping structure 425 to determine whether the AOR included in the call request message corresponds with the physical layer identifier associated with the request message. The AOR mapping structure 425 includes the AOR field 427 and the corresponding physical layer identifier field 429. If the AOR included in the call request message does not correspond with the physical layer identifier associated with the request message, then at operation 4A flow moves to block 435 where the packet is dropped. If the AOR included in the call request message corresponds with the physical layer identifier, at operation 4B flow moves to the number analysis module 430 which performs a number analysis for the call request. The number analysis determines the dialed number. If the number dialed is an emergency number (e.g., 911 or other emergency number), the flow moves to the emergency call module 440 at operation 5A. If the number dialed is not an emergency number, then at operation 5B the flow moves to the call rate monitor module 455.

As described previously, E911 regulations require that an accurate subscriber location be sent along with every emergency call. The emergency call module 440 determines the physical address of the subscriber (a street address) at operation 6A by accessing the subscriber attributes 450. According to one embodiment of the invention, the subscriber attributes 450 include the street addresses of the subscribers and is populated during authentication of the subscribers (e.g., during establishment of the subscriber connections). For example, the subscriber attributes 450 are derived from the subscriber records stored in a remote database server (e.g., an AAA server). Although not illustrated, according to another embodiment of the invention, the emergency call module 440 requests the physical address of the subscriber (e.g., based on the physical layer identifier and/or the subscriber name associated with the request message) from a remote database server (e.g., an AAA server). Sometime after the physical address of the subscriber is known, at operation 7A flow moves to the feature application module 455, which applies features (e.g., codec application, priority level, etc.) and flow moves to the continue processing block 460 which continues the processing (e.g., including transmission of the message, including the street address, to the softswitch 160).

According to one embodiment of the invention, the highest quality codec is applied to an emergency call and the call is given the highest priority handling within the network element. As described previously herein, the network element 110 may process traffic for multiple sessions and/or media traffic of a given subscriber connection at a given time. Upon determining that there is an emergency VoIP call for a particular subscriber connection, in one embodiment of the invention, the S-SBC module 240 may delay or drop other traffic on that subscriber connection to allow the emergency VoIP call to be processed at the highest priority.

In another embodiment of the invention, the network element transmits a request for the street address of the subscriber to a different network element (typically belonging to the ISP that provides the service to the subscriber) and that different network element transmits the street address directly to the softswitch 160.

Since the street addresses of the subscribers are tied to the physical layer information of those subscribers (and not only the AOR of the subscribers) the address information will be more accurate than typical prior art implementations. Typical prior art VoIP services require subscribers to manage their address information. As a result, typical VoIP services do not have an independent mechanism for determining whether a subscriber has moved. Thus, if the subscriber moves and does not update their address information, their address information will not be accurate. However, in embodiments of the invention, subscribers do not manage their address information (e.g., the address information is managed by the Internet Service Providers (ISPs) providing Internet service to the subscribers) and the physical address of the subscribers will be accurate even if the subscriber moves addresses. For example, typically a subscriber has an account with an ISP and has to provide a street address where the account is located (e.g., in order to bill the subscriber) and the account is typically only good at that location. If the subscriber moves, the subscriber must let the ISP know that the subscriber has moved and where the subscriber has moved. Thus, the ISP will have an accurate street address of the subscriber at any given time the ISP provides service to that subscriber. Since the network element includes a subscriber management system which establishes subscriber connections (e.g., on behalf of the ISPs), the network element has access to the street addresses of the subscribers as provided by the ISPs (e.g., direct access, upon request from the ISP, etc.).

Referring back to FIG. 4, if the dialed number is not an emergency call, then at operation 5B the flow moves to the call rate monitor module 455. According to one embodiment of the invention, if the call request message is not for a VoIP session, then the number analysis module will not execute (e.g., the message is passed from the verification module 420 to the call rate monitor 455 directly).

The call rate monitor module 455 monitors the number of calls made by a subscriber (as determined by the physical layer identifier) over a given time period. If a large amount of calls in a short time period have been observed for a particular physical layer identifier (e.g., greater than a predefined threshold), the subscriber corresponding with that physical layer identifier may be performing a Denial of Service (DoS) attack or may have something wrong with their equipment (e.g., a worm or virus may be causing their VoIP phone to make many phone calls). According to one embodiment of the invention, the call rate monitor module 455 stores a history of the calls made for each physical layer identifier over a given time period (e.g., the number of calls for a recent time period (e.g., the last 2-10 minutes)).

If there is an abnormal rate of calls being made (or sessions trying to be established), corrective action may be taken. For example, as illustrated in FIG. 4, if there is an abnormal rate of calls being made, then the packet will be dropped at operation 6C and the call will not be placed. If there is not an abnormal rate of calls, then at operation 6B flow moves to the feature application module 455. Of course it should be understood that other corrective actions may be taken (e.g., rate limiting, notification, temporarily blocking signaling traffic received from that subscriber connection, etc.).

Thus, unlike typical prior art VoIP services which may detect an abnormal amount of calls based on the AORs, which can be spoofed, in embodiments of the invention the detection is based on the physical layer identifier which cannot be spoofed. Thus, in prior art VoIP services a malicious person may be able to make many calls if they spoof enough AORs (e.g., via a worm or virus that infects many subscribers). However, in embodiments of the invention the detection is based on the physical layer identifier which cannot be spoofed.

The feature application module 455 applies features to the calls based on the subscriber attributes associated with the subscribers (based on the physical layer identifier) and/or the network element attributes 458. For example, in addition to the street address of the subscribers, the subscriber attributes may include the codecs used (some codecs require more bandwidth than other codecs), access control, rate-limiting values, policing values, bandwidth values, etc. The network element attributes 458 includes the total bandwidth available on the network element. At operation 7B, the feature application module 455 accesses the subscriber attributes 450 based on the physical layer identifier associated with the call request. At operation 7C, the feature application module 455 accesses the network element attributes 458.

At operation 8, the feature application module 455 applies the features to the call and processing of the call continues 460. According to one embodiment of the invention, if there is enough available bandwidth (e.g., as indicated by the network attributes 458), the feature application module 455 applies the highest quality codec for the call. If the amount of bandwidth is limited, the feature application module 455 applies the codec as indicated in the subscriber attributes 450.

Thus, unlike typical prior art VoIP services that apply features based on an AOR included in a call request message, which can be spoofed, in embodiments of the invention the features are applied based on the physical layer identifier associated with the call request message which cannot be spoofed.

It should be understood that the AOR mapping structure 425 and the subscriber attributes 450 may be combined in a single structure in one embodiment of the invention.

In one embodiment of the invention, the flow moves from the number analysis module 430 to the feature application module 455 upon determining that the number is not an emergency number.

Figure 5:
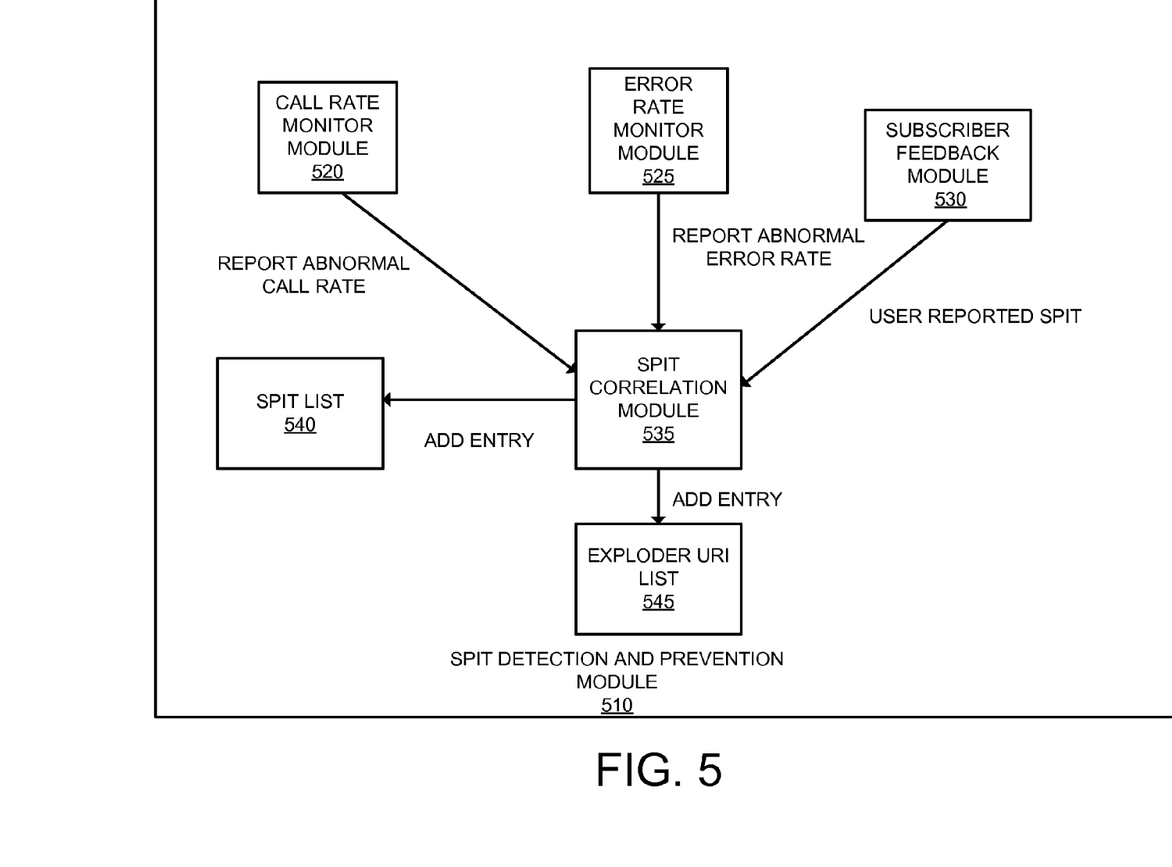
FIG. 5 illustrates an exemplary SPIT (Spam over Internet Telephony) detection and prevention module according to one embodiment of the invention.

FIG. 5 illustrates an exemplary SPIT (Spam over Internet Telephony) detection and prevention module 510. In one embodiment of the invention, the SPIT detection and prevention module 510 is included in the session border controller 155. The SPIT detection and prevention module 510 includes the call rate monitor module 520, the error rate monitor module 525, the subscriber feedback module 530, the SPIT correlation module 535, the SPIT list 540, and the exploder URI list 545.

The call rate monitor module 520 monitors the number of calls sent for a particular physical identifier. Similar to the call rate monitor module 455, if a large amount of calls in a short time period have been observed for a particular physical layer identifier, the subscriber corresponding with that physical layer identifier may be performing a Denial of Service (DoS) attack or may have something wrong with their equipment (e.g., a worm or virus may be causing their VoIP phone to make many phone calls). According to one embodiment of the invention, the call rate monitor module 520 stores a history of the calls made for each physical layer identifier over a given time period (e.g., the number of calls for a recent time period (e.g., the last 2-10 minutes)). The call rate monitor module 520 reports abnormal call rates for physical layer identifiers (e.g., over a predefined threshold) to the SPIT correlation module 535.

The error rate monitor module 525 monitors the number of errors associated with a particular physical identifier (e.g., the number of calls rejected, etc.). The error rate monitor module 525 stores a small amount of history for the calls having an error for each physical layer identifier. Similar to the call rate monitor module 520, the error rate monitor module 525 reports an abnormal error rates for physical layer identifiers (e.g., over a predefined threshold) to the SPIT correlation module 535.

The subscriber feedback module 530 allows subscribers to report SPIT calls (e.g., by rejecting the call and selecting a special key on their handset of their VoIP phone). The user feedback module 530 detects such call rejection and creates a history of the rejected call including the IP address, SIP URI, and physical layer identification (if available) of the SPIT caller. The user feedback module 530 sends the user reported SPIT information to the SPIT correlation module 535.

The SPIT correlation module 535 correlates the information received from the call rate monitor module 520, the error rate monitor module 525, and/or the subscriber feedback module 530 and determines whether to add an endpoint (e.g., an IP address, a SIP URI, physical layer identifier, etc.) to the SPIT list 540. The SPIT list 540 is similar to a black list but has different properties attached to different entries. In addition, unlike a typical black list, the SPIT list 540 has aging policies to retire the entries after a given time. Future calls from endpoints listed on the SPIT list 540 are processed according to a configurable policy on the session border controller 155. For example, call terminations may be rejected, call initiation attempts may be rejected, and/or a call attempt may be stamped with a SPIT warning. In the absence of any SIP headers to indicate SPIT, the SIP Warning header may be used to indicate SPIT to user agents or proxies. The SPIT correlation module 535 may also add entries to the exploder URI list 545.

The SPIT correlation module 535 may also implement link level rate limiting to counter further SPIT attempts by subscribers, add offending subscribers to access control lists, etc. In addition, the SPIT correlation module 535 may cause the subscriber connection corresponding to the offending subscribers to be removed from the network element.

Thus, unlike typical prior art implementations to prevent SPIT based on a white list, black list, and/or a circle of trust, embodiments of the invention uses a combination of call rates, call error rates, black listed SIP URIs, subscriber feedback, and physical layer identifiers of subscribers to detect and prevent SPIT in a fool proof way. For example, white lists and black lists can be spoofed, whereas a physical layer identifier cannot be spoofed.

Figure 6:
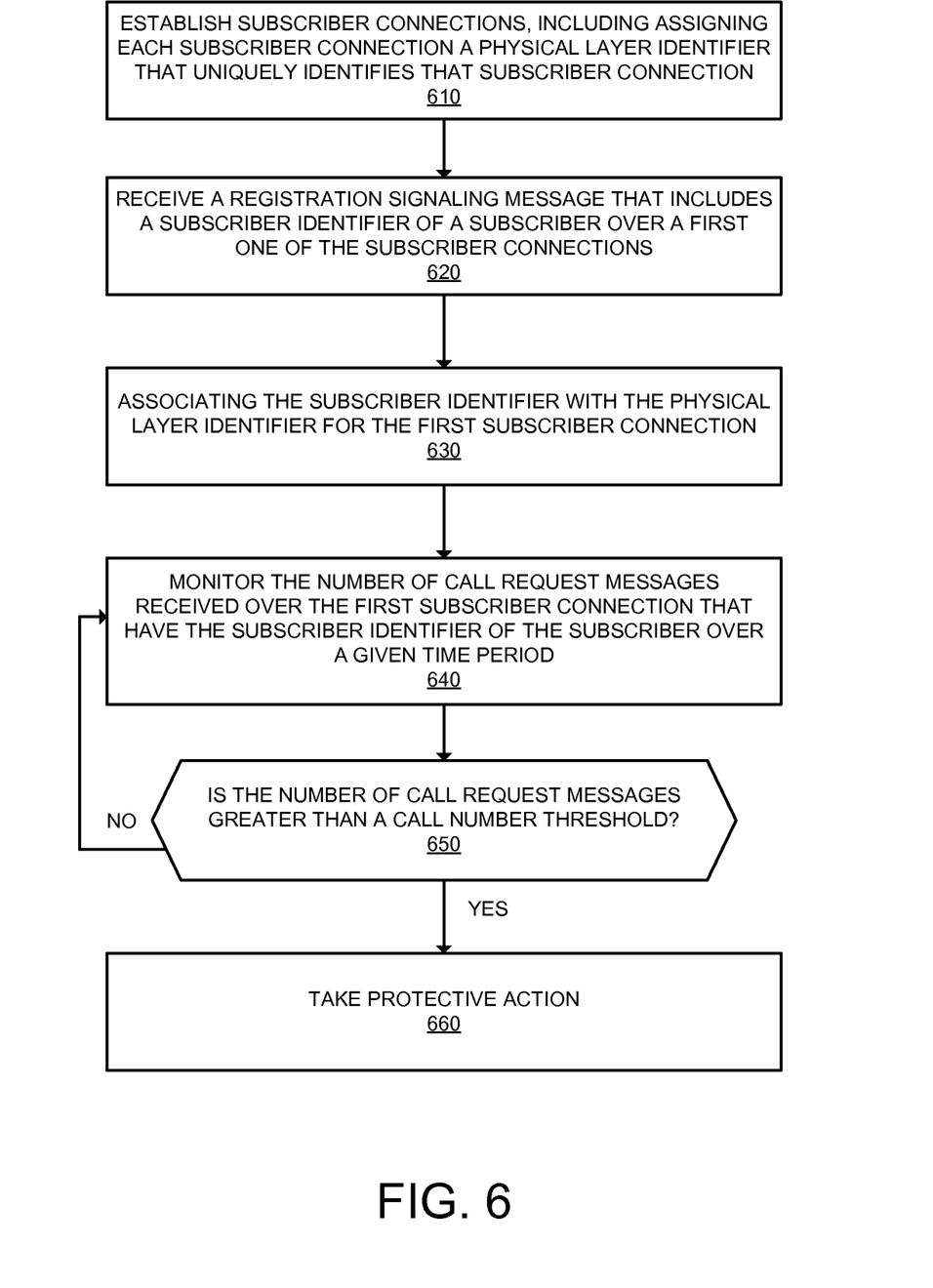
FIG. 6 is a flow diagram illustrating operations for an exemplary denial of service (DoS) detection and prevention mechanism according to one embodiment of the invention.

FIG. 6 is a flow diagram illustrating operations for an exemplary denial of service (DoS) detection and prevention mechanism according to one embodiment of the invention. According to one embodiment of the invention, the operations of FIG. 6 are performed by the network element 110.

At block 610, multiple subscriber connections are established for multiple subscribers, each subscriber connection being established responsive to receiving a connection request message. Each subscriber connection is assigned a physical layer identifier that uniquely identifies that subscriber connection. The physical layer identifiers are based on physical layer information on which the corresponding connection request messages were received (e.g., agent circuit ID, agent remote ID). Flow moves from block 610 to block 620.

At block 620, a registration signaling message (e.g., a SIP REGISTER message) is received over a first one of the established subscriber connections. The registration signaling message includes a subscriber identifier (e.g., an AOR) of a subscriber. Flow moves from block 620 to block 630.

At block 630, the subscriber identifier included in the registration signaling message is associated with the physical layer identifier for the first subscriber connection. According to one embodiment of the invention, this association occurs only after determining that the physical layer identifier is not already associated with an AOR for a given session type (that is, only a single AOR for a given session type can be associated with the physical layer identifier of the subscriber connection). Flow moves from block 630 to block 640.

At block 640, the number of call request messages (e.g., SIP INVITE messages) received over the first subscriber connection that have the subscriber identifier of the subscriber are monitored over a given time period. The call request messages may be for different session types including VoIP, video conferencing, video on demand, interactive gaming, etc. For example, a history of the call request messages received is stored for a given amount of time (e.g., the last 2-10 minutes). Flow moves from block 640 to block 650.

At block 650, a determination is made whether the number of call request messages is greater than a predefined call number threshold over a given time period. If the number of call request messages is greater than the call number threshold (thus there is an abnormal number of call request messages being received over the subscriber connection), then flow moves to block 660. If the number of call request messages is less than the call number threshold, then flow moves back to block 640. At block 660, protective action is taken (e.g., subsequent call request messages received on the subscriber connection are dropped or temporarily blocked, the subscriber is notified of the excessive call requests, etc.).

Figure 7:
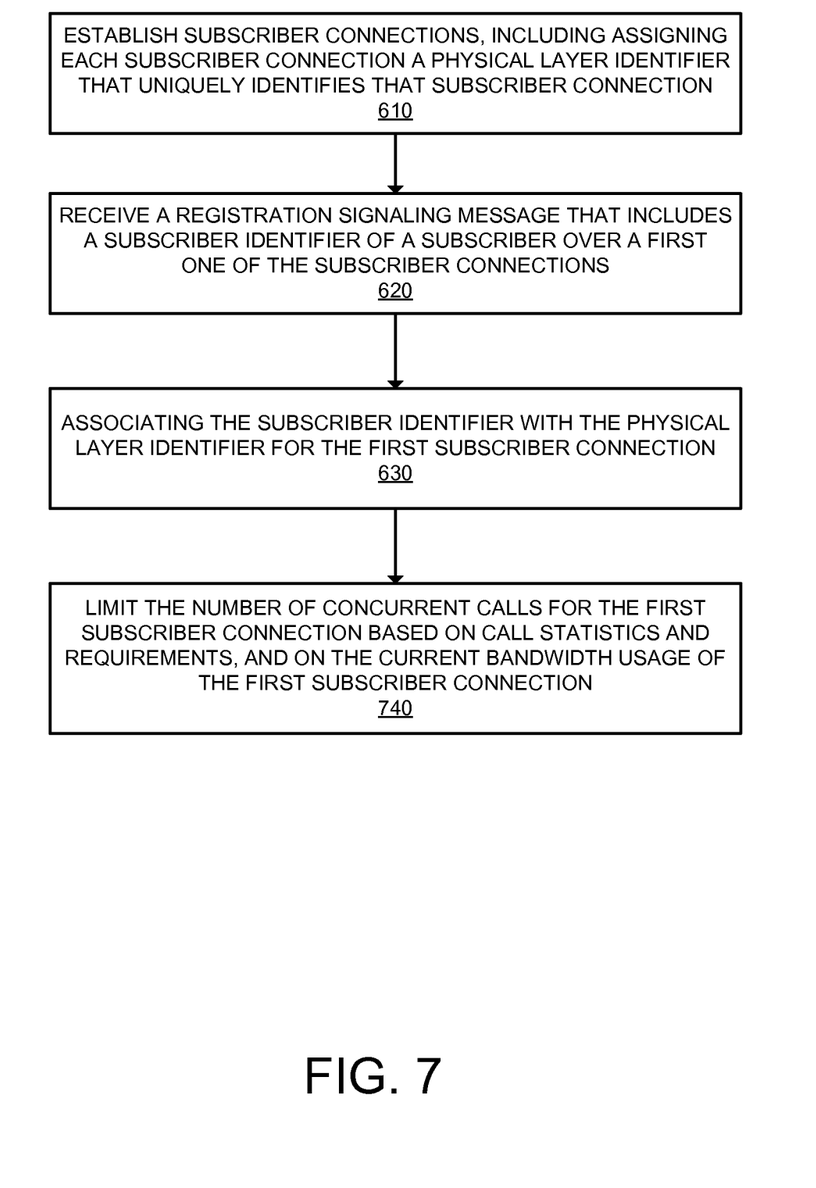
FIG. 7 is a flow diagram illustrating operations for an exemplary intelligent call admission control mechanism according to one embodiment of the invention.

FIG. 7 is a flow diagram illustrating operations for an exemplary intelligent call admission control mechanism according to one embodiment of the invention. According to one embodiment of the invention, the operations of FIG. 7 are performed by the network element 110. FIG. 7 includes the blocks 610, 620, and 630 and the operations are performed similarly. Flow moves from block 630 to block 740.

At block 740, the number of concurrent calls allowed for the first subscriber connection is limited based on the call statistics and requirements (e.g., the bandwidth required for each call) and the current bandwidth usage of the first subscriber connection. In one embodiment of the invention, the number of calls, and/or call requirements, may be adjusted based on the total aggregate bandwidth usage of the network element. For example, if the network element has sufficient bandwidth available, the limit on the number of calls may be increased and/or the codec quality may be increased. In one embodiment, subscribers may be allowed to choose the codec in use based on the available bandwidth.

While embodiments of the invention have been described in relation to a single network element having a subscriber management system and a session border controller, alternative embodiments of the invention have the subscriber management system and the session border controller in separate network elements. For example, the physical layer identifiers of the subscriber connections may be transmitted to a session border controller implemented in a different network element.

As another example, the physical layer information which the physical layer identifier is based from (e.g., the agent remote ID and the agent circuit ID) may be transmitted to a session border controller implemented on a different network element. That session border controller then can generate a physical layer identifier and associate those physical layer identifiers with the AORs received in the messages, and determine whether to allow the calls based on that association.

While embodiments of the invention have been described in relation to VoIP, it should be understood that embodiments of the invention are applicable to other session types and/or media. For example, embodiments of the invention may use the physical layer identifiers to detect and/or prevent Denial of Service (DoS) attacks for other session type initiations (e.g., video conferencing, interactive gaming, video on demand, etc.) and/or other media types (e.g., audio, video, fax, file transfer, etc.). As another example, embodiments of the invention may use the physical layer identifiers to limit the bandwidth usage based on the session type and/or media it uses.

Embodiments of the invention also may be used for intelligent call admission control. For example, since the network element is responsible for the establishment of the subscriber circuits.

Thus, embodiments of the invention allow for providing subscriber aware services based on the physical layer identifiers of the subscriber connections in combination with the subscriber identifiers included in session signaling messages.

While the operations of the data flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network element, the method comprising:
  establishing a plurality of subscriber connections for a plurality of subscribers, wherein
    the establishing of each of the plurality of subscriber connections includes:
      receiving a connection request message from a subscriber that includes physical layer information identifying a physical access connection on which the connection request message was received, and
      assigning a unique physical layer identifier for the subscriber connection that uniquely identifies the subscriber connection, the physical layer identifier being based on the physical layer information,
  receiving a first signaling message over a first one of the plurality of established subscriber connections, the first signaling message including a subscriber identifier of a first one of the plurality of subscribers;
  associating the subscriber identifier of the first one of the plurality of subscribers with the physical layer identifier for the first one of the plurality of subscriber connections; and
  upon receiving subsequent messages having the subscriber identifier of the first one of the plurality of subscribers, each of the received messages being associated with one of the plurality of physical layer identifiers, processing those messages that are associated with the physical layer identifier for the first one of the plurality of subscriber connections.

2. The method of claim 1, further comprising dropping those subsequently received signaling messages that are not associated with the physical layer identifier for the first one of the plurality of subscriber connections.

3. The method of claim 1, wherein the network element includes a subscriber management system and a session border controller module, wherein the subscriber management system performs the establishment of the plurality of subscriber connections, and the session border controller module performs the association of the subscriber identifier with the physical layer identifier for the first one of the plurality of subscriber connections and processes those messages that are associated with the physical layer identifier for the first one of the plurality of subscriber connections.

4. The method of claim 1, wherein the first signaling message is a Session Initiation Protocol (SIP) register message, wherein the subscriber identifier is an address of record of the first one of the plurality of subscribers, wherein at least some of the subsequent messages are SIP invite messages.

5. The method of claim 1, wherein at least one of those subsequent messages is a VoIP message requesting an emergency call, wherein the processing of the VoIP message includes determining a street address of the subscriber belonging to the VoIP message based on the physical layer identifier associated with the VoIP message.

6. The method of claim 1, wherein processing those messages that are associated with the physical layer identifier for the first one of the plurality of subscriber connections includes applying features to those messages based on the physical layer identifier.

7. The method of claim 1, further comprising monitoring a number of subsequent signaling messages received over a given time period that include the subscriber identifier of the first one of the plurality of subscribers and are associated with the physical layer identifier for the first one of the plurality of subscriber connections, wherein if the number of messages exceed a threshold over that given time period, taking corrective action.

8. The method of claim 1, further comprising for each of the subscriber connections, limiting the number of concurrent calls allowed for that subscriber connection based on an amount of bandwidth required for each call and an amount of bandwidth available on the subscriber connection.

9. A network element, comprising:
a set of one or more processors, the set of one or more processors configured to generate the following:
a subscriber management system to establish a plurality of subscriber connections for a plurality of subscribers respectively, the subscriber management system including,
an authentication, authorization, and accounting (AAA) module to authenticate and authorize subscribers;
a circuit manager to assign a physical layer identifier for each of the subscriber connections, and to pass at least certain of those physical layer identifiers to a session border controller module; and
the session border controller module coupled with the subscriber management system, the session border controller module including a signaling session border controller module to perform the following:
receive registration messages over the established subscriber connections, each of the registration messages including a subscriber identifier of one of the plurality of subscribers,
for each registration message received, associate the subscriber identifier included in that registration message with the physical layer identifier of the subscriber connection on which the message was received,
receive call request messages over the established subscriber connections, each of the call request messages including a subscriber identifier of one of the plurality of subscribers, and
for each received call request message, process that call request message upon a determination that the subscriber identifier in the call request message is associated with the physical layer identifier for the subscriber connection on which the call message was received.

10. The network element of claim 9, wherein the signaling session border controller module, for each received call request message, is further to drop the call request message upon a determination that the subscriber identifier in the call request message is not associated with the physical layer identifier for the subscriber connection on which the call message was received.

11. The network element of claim 9, wherein the registration messages are a Session Initiation Protocol (SIP) REGISTER messages, wherein the subscriber identifiers are address of records (AORs), and wherein the call request messages are SIP INVITE messages.

12. The network element of claim 9, wherein at least one of the received call request messages is a VoIP message requesting an emergency call, wherein the signaling session border controller module further is to determine a street address of the subscriber associated with the subscriber connection on which the message was received based on the physical layer identifier for the subscriber connection.

13. The network element of claim 9, wherein the signaling session border controller module further is to, for each subscriber connection, monitor a number of call request messages received over a time period on that subscriber connection and take protective action if the number of call requests messages exceed a threshold over that time period.

14. The network element of claim 9, wherein the session border controller module further includes a SPIT detection and prevention module, the SPIT detection and prevention module to detect SPIT calls for a particular physical layer identifier and take protective action responsive to detecting SPIT calls.

15. A non-transitory machine-readable storage medium that provides instructions that, if executed by a processor, will cause said processor to perform operations comprising:
establishing a plurality of subscriber connections for a plurality of subscribers, wherein
the establishing of each of the plurality of subscriber connections includes:
receiving a connection request message from a subscriber that includes physical layer information identifying a physical access connection on which the connection request message was received, and
assigning a unique physical layer identifier for the subscriber connection that uniquely identifies the subscriber connection, the physical layer identifier being based on the physical layer information,
receiving a first signaling message over a first one of the plurality of established subscriber connections, the first signaling message including a subscriber identifier of a first one of the plurality of subscribers;
associating the subscriber identifier of the first one of the plurality of subscribers with the physical layer identifier for the first one of the plurality of subscriber connections; and
upon receiving subsequent messages having the subscriber identifier of the first one of the plurality of subscribers, each of the received messages being associated with one of the plurality of physical layer identifiers, processing those messages that are associated with the physical layer identifier for the first one of the plurality of subscriber connections.

16. The machine-readable storage medium of claim 15, further comprising dropping those subsequently received signaling messages that are not associated with the physical layer identifier for the first one of the plurality of subscriber connections.

17. The machine-readable storage medium of claim 15, wherein the instructions are executed on a network element, wherein the network element includes a subscriber management system and a session border controller module, wherein the subscriber management system performs the establishment of the plurality of subscriber connections, and the session border controller module performs the association of the subscriber identifier with the physical layer identifier for the first one of the plurality of subscriber connections and processes those messages that are associated with the physical layer identifier for the first one of the plurality of subscriber connections.

18. The machine-readable storage medium of claim 15, wherein the first signaling message is a Session Initiation Protocol (SIP) register message, wherein the subscriber identifier is an address of record of the first one of the plurality of subscribers, wherein at least some of the subsequent messages are SIP invite messages.

19. The machine-readable storage medium of claim 15, wherein at least one of those subsequent messages is a VoIP message requesting an emergency call, wherein the processing of the VoIP message includes determining a street address of the subscriber belonging to the VoIP message based on the physical layer identifier associated with the VoIP message.

20. The machine-readable storage medium of claim 15, wherein processing those messages that are associated with the physical layer identifier for the first one of the plurality of subscriber connections includes applying features to those messages based on the physical layer identifier.

21. The machine-readable storage medium of claim 15, further comprising monitoring a number of subsequent signaling messages received over a given time period that include the subscriber identifier of the first one of the plurality of subscribers and are associated with the physical layer identifier for the first one of the plurality of subscriber connections, wherein if the number of messages exceed a threshold over that given time period, taking corrective action.

22. The machine-readable storage medium of claim 15, further comprising for each of the subscriber connections, limiting the number of concurrent calls allowed for that subscriber connection based on an amount of bandwidth required for each call and an amount of bandwidth available on the subscriber connection.

\* \* \* \* \*